United States Patent
Srinivas et al.

(10) Patent No.: US 9,383,834 B2
(45) Date of Patent: Jul. 5, 2016

(54) SYSTEM AND METHOD FOR CREATING AND MODIFYING PHYSICALLY TRANSIENT HANDWRITTEN DIGITAL DOCUMENTS

(71) Applicant: Xerox Corporation, Norwalk, CT (US)

(72) Inventors: Sharath Srinivas, Webster, NY (US); Eric Michael Gross, Rochester, NY (US); Jack Gaynor Elliot, Penfield, NY (US); Bryan J. Roof, Newark, NY (US)

(73) Assignee: Xerox Corporation, Norwalk, CT (US)

( * ) Notice: Subject to any disclaimer, the term of this patent is extended or adjusted under 35 U.S.C. 154(b) by 415 days.

(21) Appl. No.: 13/726,820

(22) Filed: Dec. 26, 2012

(65) Prior Publication Data

US 2014/0176512 A1    Jun. 26, 2014

(51) Int. Cl.
*G06F 3/0354*  (2013.01)
*G06F 3/03*  (2006.01)

(52) U.S. Cl.
CPC .......... *G06F 3/03545* (2013.01); *G06F 3/0317* (2013.01); *G06F 3/0321* (2013.01); *G06F 3/03542* (2013.01); *G06F 2203/0384* (2013.01)

(58) Field of Classification Search
CPC ............ G06F 3/04883; G06F 3/03542; G06F 3/03545
See application file for complete search history.

(56) References Cited

U.S. PATENT DOCUMENTS

| | | | |
|---|---|---|---|
| 4,164,078 A | 8/1979 | Goldfarb | |
| 4,261,241 A | 4/1981 | Gould et al. | |
| 5,281,146 A | 1/1994 | Janney | |
| 6,011,949 A | 1/2000 | Shimomukai | |
| 6,208,771 B1 | 3/2001 | Jared et al. | |
| 6,432,518 B1* | 8/2002 | Torii et al. | 428/195.1 |
| 7,618,259 B2 | 11/2009 | Manos | |
| 7,645,560 B1 | 1/2010 | Iftime et al. | |
| 7,831,933 B2 | 11/2010 | Marggraff et al. | |
| 7,853,193 B2 | 12/2010 | Marggraff | |
| 8,261,967 B1 | 9/2012 | Long et al. | |
| 2003/0001020 A1 | 1/2003 | Kardach | |
| 2003/0180703 A1 | 9/2003 | Yates et al. | |
| 2004/0093346 A1 | 5/2004 | Hochman | |
| 2005/0099409 A1* | 5/2005 | Brouhon | 345/179 |
| 2006/0256371 A1 | 11/2006 | King et al. | |
| 2008/0191136 A1* | 8/2008 | Shrader et al. | 250/316.1 |
| 2008/0264701 A1 | 10/2008 | Radtke et al. | |
| 2009/0202971 A1 | 8/2009 | Cortez | |
| 2009/0204821 A1 | 8/2009 | Fransson et al. | |
| 2011/0079735 A1* | 4/2011 | Roof et al. | 250/492.1 |
| 2012/0118964 A1 | 5/2012 | Kindberg et al. | |
| 2012/0282587 A1 | 11/2012 | Lofthus et al. | |
| 2013/0195381 A1 | 8/2013 | Elliot et al. | |

FOREIGN PATENT DOCUMENTS

JP    2004-94558    *  3/2004 ................ G06F 3/03

* cited by examiner

*Primary Examiner* — David Tung
(74) *Attorney, Agent, or Firm* — Fox Rothschild LLP

(57) ABSTRACT

A method, system, and apparatus for capturing information is disclosed. The method includes emitting energy of a first wavelength from a first energy source located proximate to a first end of a digital pen and forming a first set handwritten markings on the substrate by causing the substrate to image as a result of an exposure of the substrate to the energy emitted from the first energy source. The method also includes detecting by an image-capturing sensor of the digital pen a first detected portion of a position-identifying pattern on the substrate and storing in the memory a digital document file comprising the first set of handwritten markings and the first detected portion of the position-identifying data. An apparatus and system for performing the method is also disclosed.

21 Claims, 6 Drawing Sheets

SYSTEM AND METHOD FOR CREATING AND MODIFYING PHYSICALLY TRANSIENT HANDWRITTEN DIGITAL DOCUMENTS

BACKGROUND

Paper media bearing permanent ink are non-reusable and are often discarded after being read. Although paper media are relatively inexpensive, the quantity of discarded paper media is enormous and its disposal raises cost and environmental issues.

In contrast to paper media, erasable media may be reused many times to transiently store images and/or text. For example, an erasable medium may include a photochromic material that undergoes reversible photo-induced color change to enable image-writing and image-erasing. Ultraviolet (UV) light is often used to induce image-writing and heat is often used to induce image-erasing.

Examples of erasable media include that described in a commonly assigned U.S. Pat. No. 7,645,560 issued Jan. 12, 2010 and titled "Inkless Reimageable Printing Paper and Method," the disclosure of which is incorporated in its entirety herein by reference. An embodiment of the erasable medium formulation detailed in the patent includes a photochromic material, for example an alkoxy modified dithienylethene. Use of this material allows for the imaging of a pattern onto the medium using patterned ultraviolet (UV) light. The UV light chemically alters the formulation to produce a visible image pattern. The image remains visible for a period of time, but is erasable on demand using one or more of heat and visible light. The chemical formulation of the erasable medium is re-imageable such that the same or a different pattern can be re-imaged.

There are several different types of conventional pens, including ballpoint, rollerball, fountain, and felt-tip, which are used for writing. The writing is achieved by applying permanent ink to a surface of, for example, paper media. However, conventional ink pens can not be used in the context of the reusable erasable media, due in part to the composition of erasable media and further due to the permanent nature of conventional ink pens. Digital pens have also been introduced that include memory storage for the recording of written and oral notes.

Additionally, pens have been developed specifically for use with erasable media. Example pens designed for use with erasable media include that described in commonly assigned U.S. patent application Ser. No. 12/573,478 filed Oct. 5, 2009 and titled "Pen Specific for Erasable Media Usage," the disclosure of which is incorporated in its entirety herein by reference. An embodiment of the pen for use with erasable media includes a pen barrel, a first radiant energy source mounted within a writing end of the pen barrel, and a second radiant energy source mounted within an erasing end of the pen barrel. The first radiant energy source is configured to image an erasable medium, while the second radiant energy source is configured to erase an imaged region of the erasable medium.

Pens for use with erasable media, however, do not include any mechanisms for storing handwritten marks in a computer readable format. Conventional digital pens use permanent ink and cannot be used with erasable media. Therefore, there is a need to overcome these and other problems in the prior art and to provide a pen, having certain attributes of a conventional ink digital pen, but specific to imaging and erasing of erasable media.

SUMMARY

An information capture system is disclosed for use with a substrate having a position-identifying pattern printed thereon. The substrate includes an imaging layer that is imageable when exposed to an energy emission of a first wavelength and erasable when exposed to an energy emission of a second wavelength. The information capture system includes a digital pen having a first end, a second end, an image-capturing sensor proximate the first end, and a memory. The digital pen also includes a first energy source that is capable of emitting energy of the first wavelength and that is proximate to the first end.

The digital pen includes program instructions that are capable of instructing the digital pen to emit energy from the first energy source when the first end is proximate to the substrate, in which the energy from the first energy source is capable of causing the substrate to form an image comprising a first set of handwritten markings thereon. The program instructions are also capable of instructing the digital pen to detect by the image-capturing sensor a first detected portion of the position-identifying pattern, in which the first detected portion corresponds to a location of the first set of handwritten markings on the substrate. The program instructions are also capable of instructing the digital pen to store, in the memory, a digital document file comprising the first set of handwritten markings and the first detected portion of the position-identifying pattern.

In an embodiment, a method of capturing information is disclosed. The method includes emitting energy of a first wavelength from a first energy source located proximate to a first end of a digital pen, in which the energy is emitted when the first end of the digital pen is proximate to a substrate. The method also includes forming an image comprising a first set handwritten markings on the substrate as a result of an exposure of the substrate to the energy emitted from the first energy source. The method also includes detecting by an image-capturing sensor of the digital pen a first detected portion of a position-identifying pattern on the substrate, in which the first detected portion corresponds to a location of the first set of handwritten markings on the substrate. The method also includes storing in the memory a digital document file comprising the first set of handwritten markings and the first detected portion of the position-identifying data.

In an embodiment, a digital pen is disclosed that includes a housing, a processor, an image-capturing sensor, a document memory for storing digital documents, and a first energy source that is capable of emitting energy of the first wavelength that is proximate to a first end of the housing. The digital pen also includes a computer readable storage medium configured to store program instructions capable of instructing the processor perform a number of functions. The program instructions are capable of instructing the processor to cause the first energy source to emit energy when the first end is proximate to the substrate, in which the energy from the first energy source is capable of causing the substrate to form an image comprising a first set handwritten markings thereon. The program instructions are also capable of instructing the processor to receive from the image-capturing sensor a first detected portion of a position-identifying pattern on the substrate and the first set of handwritten markings. The program instructions are also capable of instructing the processor to determine the location of the first set of handwritten markings on the substrate based on the first detected portion of the position-identifying pattern. The program instructions are also capable of instructing the processor to generate a digital document comprising the first set of handwritten markings and the first detected portion of the position-identifying pattern.

DETAILED DESCRIPTION

Figure 1:
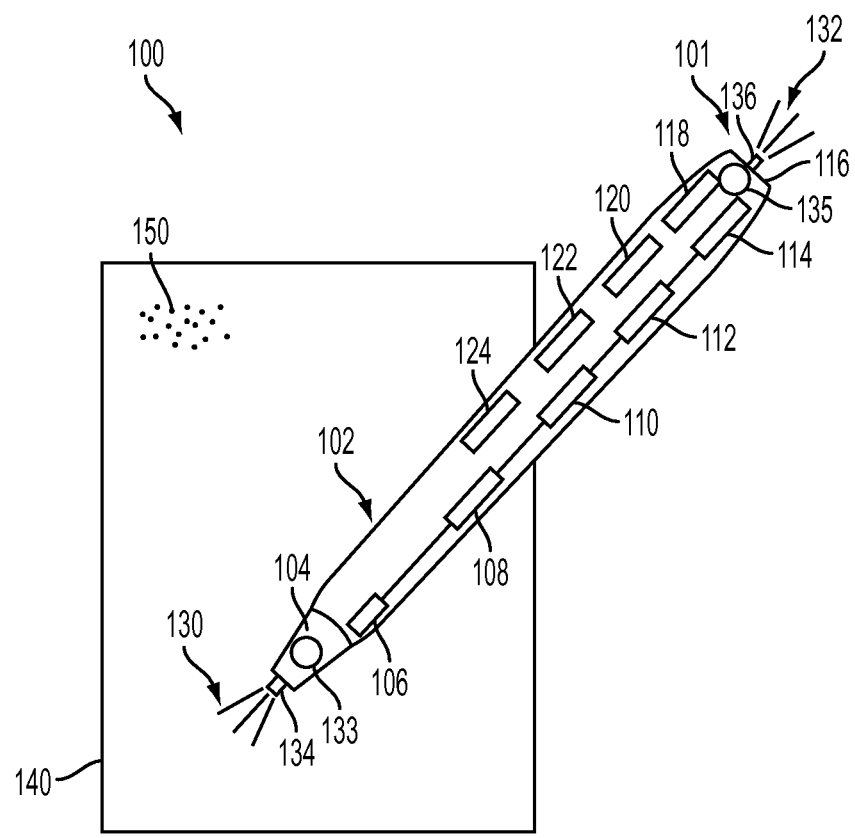
FIG. 1 is an illustration of an information capturing system in accordance with embodiments of the present disclosure.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used in this document, a statement that a device or system is "in electronic communication with" another device or system means that devices or systems are configured to send data, commands and/or queries to each other via a communications network. The network may be a wired or wireless network such as a local area network, a wide area network, an intranet, the Internet or another network.

A "computing device" refers to a computer, a processor and/or any other component, device or system that performs one or more operations according to one or more programming instructions.

The term "data" may refer to physical signals that indicate or include information. A "data bit" may refer to a single unit of data.

An "image," as a pattern of physical light or a collection of data representing the physical light, may include characters, words, symbologies, graphics and other features, as well as combinations thereof. A "digital image" is by extension an image represented by a collection of digital data. A "digital document" is by extension a document represented by a collection of digital data.

A "digital pen" refers to an input device that is capable of both writing on a substrate and capturing data corresponding to the user's handwriting or strokes. The digital pen contains components that convert the handwritten markings into digital data which can be saved on a computer-readable storage medium. Digital pens may contain accelerometers that can detect the movement of the pen on the substrate. Digital pens may also include positional technology which can physically detect the location of the pen tip during the writing process. Other digital pens can use a camera or other image-capturing sensor to detect the position of the pen tip on special digital paper that includes position identifying information.

An "electronic device" refers to a device that includes an imaging device, a processor and tangible, computer-readable memory. The memory may contain programming instructions in the form of a software application that, when executed by the processor, causes the device to perform one or more barcode scanning operations according to the programming instructions. Examples of suitable devices include portable electronic devices such as smart phones, personal digital assistants, cameras, tablet devices, electronic readers, personal computers, media players, satellite navigation devices and the like.

This disclosure describes a system to create physically transient, digital copies of handwritten documents. A digital pen is provided that has an ultraviolet (UV) energy emitting tip, and an onboard image-capturing sensor that can record the user's handwriting strokes on a reusable paper that has permanent microdot patterns of position-identifying data. By pressing the tip of the pen against the paper, both the image-capturing sensor and the UV source are activated. The UV tip leaves a mark on the erasable paper and at the same time the camera captures the user's handwriting and converts it to a digital format stored on the pen. The user can then erase the physical document using a heat or a light stimulus and can reuse the paper. The physical copy of the document will be lost, but a digital copy is still available on the pen.

Figure 2:
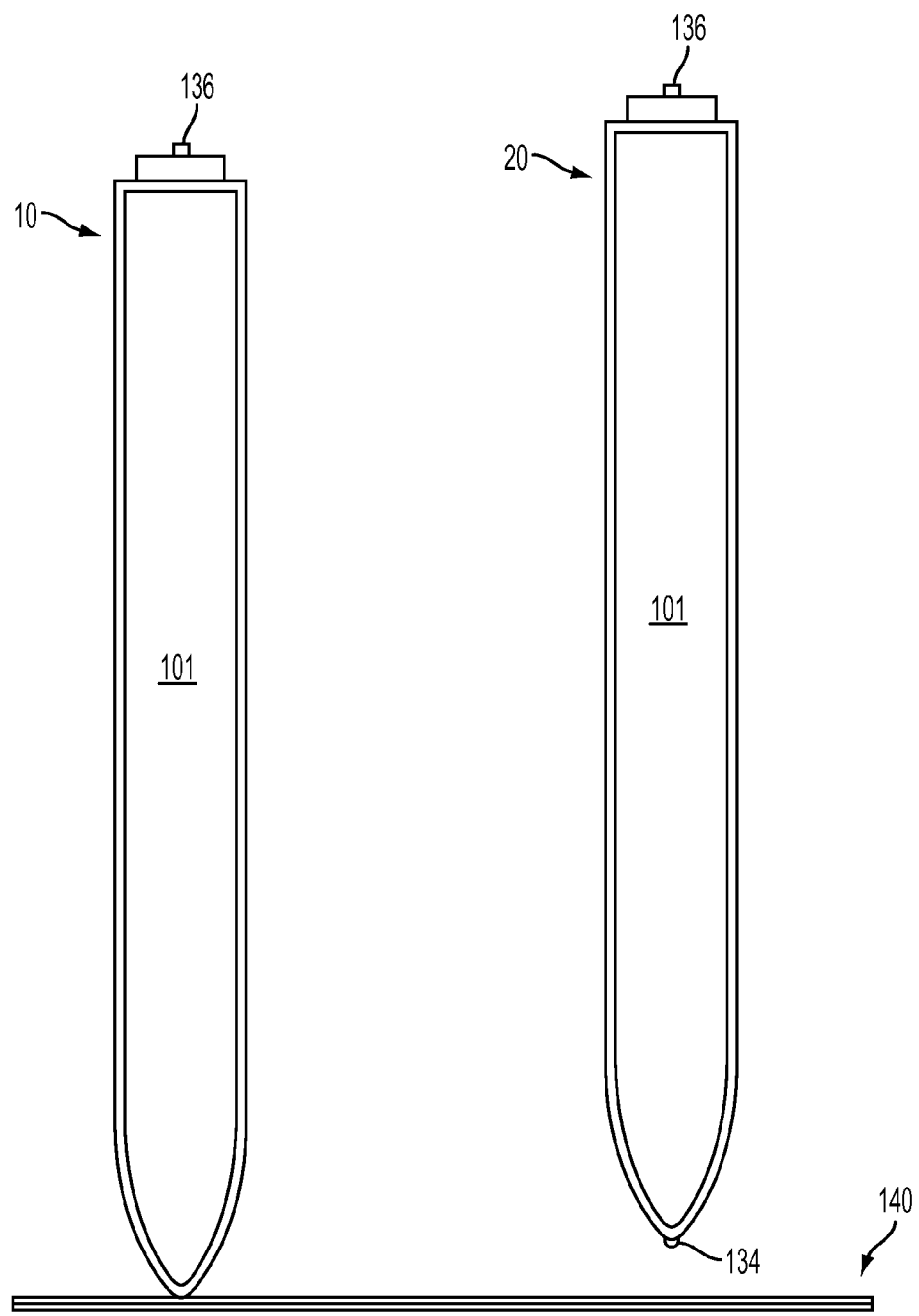
FIG. 2 is an illustration of a digital pen in accordance with embodiments of the present disclosure.

FIG. 1 illustrates an embodiment of an image capturing system. FIG. 1 shows various elements of a digital pen 101. A pen-shaped (e.g., elongated and/or tubular)' housing 102 contains a first image sensor 106 such as a camera or infrared sensor, a processor 108, a memory device 110, a transmitter/communications port 114, and a second image sensor 118. In some embodiments, the pen may include a display 120 and an audio output 122. The display may be an organic light-emitting diode (OLED) display, a sequence of lights, or any other display mechanism. The audio output may be a speaker and/or a port to which an external device such as headphones may be attached. An energy emitting writing end 104 extends from an end of the housing 102 and may be used to apply markings on a substrate 140 such as erasable paper. Energy emitting writing end 104 emits energy 130 from a first radiant energy source 133 and includes a force sensitive writing tip 134. In an embodiment, the writing tip 134 is activated when it is pressed against a writing surface 140, as shown in FIG. 2 at 10. When the digital pen 101 is lifted from the writing surface 140 the energy source 133 is deactivated and no energy is emitted, as shown in FIG. 2 at 20. In an embodiment, energy source 133 emits UV energy that may have a wavelength below 500 nanometers, e.g. between 10 and 500 nanometers.

In embodiments, for safety reasons, the writing tip 134 can be configured to ensure that the first radiant energy source 133 is activated only when the writing tip 203 is pressed against the writing surface 140, as shown in FIG. 2 at 10. In embodiments, additional components can be configured to prevent the digital pen 101 from being turned on in particular circumstances, e.g., if in contact with human skin. For example, a resistance checking device (not shown) can be assembled within the writing end 104 to establish a safe resistance for writing. For example, when an undesirable resistance is measured, such as when the writing tip 134 touches human skin, the activation switch can be controlled to disable the first radiant energy source 133.

Figure 3:
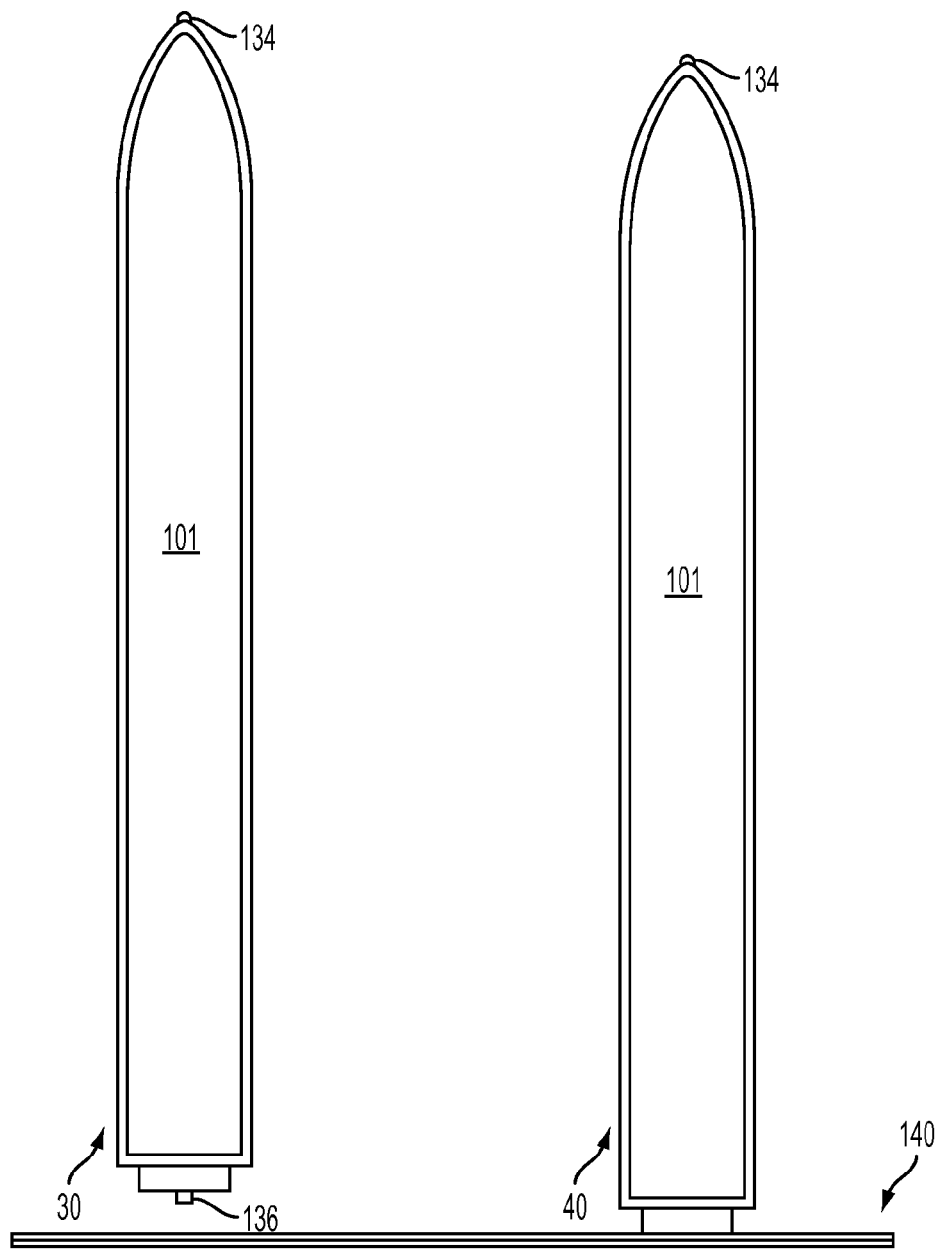
FIG. 3 is an illustration of a digital pen in accordance with embodiments of the present disclosure.

In various embodiments, when erasing is desired, e.g., if a person makes a mistake in writing or desires to revise previously printed text/images, the pen 101 can then be turned over to use the other end, i.e., the erasing end, as shown in FIG. 3 at 30. Referring again to FIG. 1, an erasing end 116 is at an end of the housing 102 that is distal to the writing tip 104. The erasing end 116 emits energy 132 from a second radiant energy source 135 and includes a force sensitive erasing tip 136. In embodiments, these components are configured similarly to the configuration of the writing end 104 of the pen 101, except that the second radiant energy source 135 is used for erasing while the first radiant energy source 133 is used for writing. In other embodiments, not shown in FIG. 1, the erasing tip 136 may at the end of the housing 102 proximate to the writing tip 104. In other words, the two radiant energy sources 133, 135 may be proximate to each other and activated through separate controls operated by the user. The embodiments are not limited in this regard.

In embodiments, when the "eraser" is activated, for example, by pushing the erasing tip 136 against the writing surface 140, as shown in FIG. 3 at 40, a narrow beam of light and/or heat generating light can be directed at a localized region of the imaged erasable medium, thereby locally erasing an image without erasing the entire erasable medium. Additionally, if the writing surface substrate 140 is comprised of paper, the poor thermal conductivity of the paper can aid in erasing by retaining and transmitting heat generated by the erasing beam. In embodiments, the erasing beam generated locally on the imaged erasable medium can have a thickness or diameter of about 4 mm or less, for example, from about 0.5 mm to about 3.5 mm or from about 1.0 mm to about 3.0 mm. In embodiment, the second radiant energy source 135 emits visible and/or infrared energy. Visible energy may have a wavelength between 500 and 800 nanometers and infrared energy may have a wavelength between 730 nanometers and 1500 nanometers.

In embodiments for safety reasons, the erasing tip 136 can be configured to ensure that the pen 101 is activated to erase only when the erasing tip 136 is pushed against the writing surface 140. In embodiments, additional components can prevent the pen 101 from being turned on if the pen is in contact with, e.g., human skin. For example, a resistance checking device (not shown) can be configured within the erasing end to determine a safe resistance for erasing. In this case, when an undesirable resistance is measured, for example, when the erasing tip 136 touches human skin the second radiant energy source 135 can not function.

Optionally, the pen 101 may include a timing circuit 112 such as a clock circuit or an interface to an external clock. In some embodiments, the timing circuit 112 may be an independent circuit, programming or another means that enables the pen to track an elapsed time. The pen also may include a position sensor 124 such as an accelerometer or gyroscope.

The substrate 140 also may include an embedded position-identifying pattern 150. The position-identifying pattern 150 will be digitally-readable indicia, such as a pattern or series of codes that uniquely identifies the document and various locations on the document. In situations where the substrates are used for information collection forms, each form (or each type of form) may contain unique elements, and the pattern will vary throughout different locations on each worksheet. For example, the indicia that are printed on an area corresponding to an information capture sheet's first data entry field may be different from that printed on the area corresponding to a different data entry field.

The embedded pattern may be any printable or printed, machine-readable indicia that may be used to provide data to identify a document and a location on the document. For example, the data may take the form of a unique, skewed dot matrix pattern such as that described above. Instead of a pure matrix pattern, in which under typical circumstances each dot is printed at the point where the horizontal and vertical guide lines of the matrix intersect, each dot would be slightly set-off or "skewed" from its intersection. Such dot matrix patterns may be generated using technologies such as those available from Anoto, Inc. The digital pen can see these dots with its sensor, and use the dots to identify the substrate and the location of the pen on the substrate. Alternatively, the embedded data may include a series of glyph codes or other codes, such as glyph codes that are generated using the process of U.S. Pat. No. 6,208,771, the disclosure of which is incorporated herein by reference in its entirety.

Figure 4:
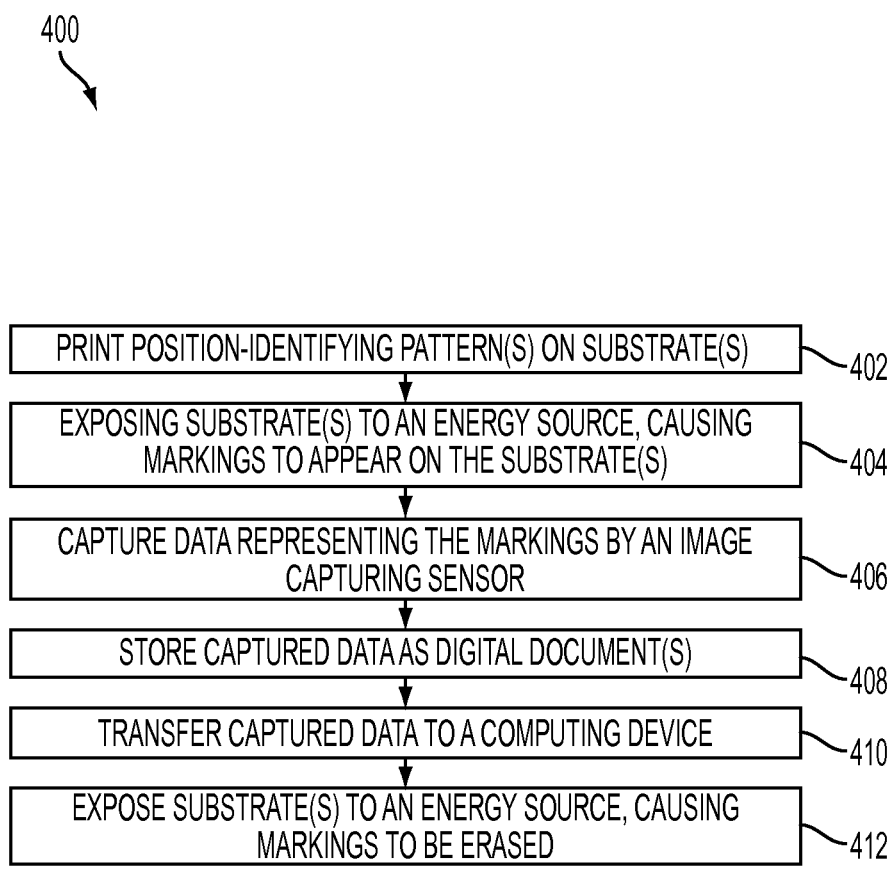
FIG. 4 is a flow chart illustrating a process in accordance with embodiments of the present disclosure.

FIG. 4 illustrates a method of using an erasable substrate and a digital pen in accordance with the present disclosure. Referring to FIG. 4, a position-identifying pattern may be permanently printed or otherwise embedded on the substrate 402. In an embodiment, the printing may be done by a laser, inkjet printer, and/or any other printing device which may use any method of applying a permanent pattern of position-identifying data on the substrate. The substrate is exposed to a writing energy source, causing markings to appear on the substrate 404. In an embodiment, photochromic chemicals in an imaging layer of the substrate may undergo structural and/or electronic rearrangements as a result of being irradiated by UV energy as described in U.S. Pat. No. 7,645,560, discussed above. The energy source may be a pen or other instrument designed for placing handwritten markings on the substrate.

An image-capturing sensor on the digital pen captures data representing the handwritten markings and the position of those handwritten markings on the substrate 406. The handwritten markings data is stored in a memory, e.g., as a digital document 408. The digital document may be a portable document format (PDF) document, a word processing format, or some other document format suitable for storing, viewing, searching, and editing handwritten digital documents. Optionally, the digital document or the data representing the handwritten markings may be transferred to a computing device for processing, storage and/or viewing 410.

The handwritten markings on the substrate may be erased when the substrate is exposed to an erasing energy source 412. In embodiments, the erasing energy source may be a visible light source and/or an infrared energy source. For example, the imaging layer of the substrate may include photochromic, thermochromic, or photochromic-thermochromic hybrid molecules. Photochromic molecules that have been colored by exposure to UV energy can be converted back to their colorless state by irradiating them with visible light. Thermochromic molecules can similarly be converted from a colored to a colorless state by exposure to infrared or thermal radiation, i.e. heat energy. Molecules that are classified as both photochromic and thermochromic can be converted from a colored to a colorless state exposure to a combination of visible and infrared energy. An example embodiment of a substrate includes an imaging layer that comprises a photochromic-thermochromic hybrid and an infrared absorber material. The energy source that erases the substrate described above may be a focused energy source that is capable of erasing markings in a small, localized area. Alternatively, the energy source may be configured to emit energy across the entire substrate, thereby erasing all markings present thereon. The energy source may be included as part of the same instrument that includes the writing energy source, or may be included in a separate device, e.g. an erasing device.

Figure 5:
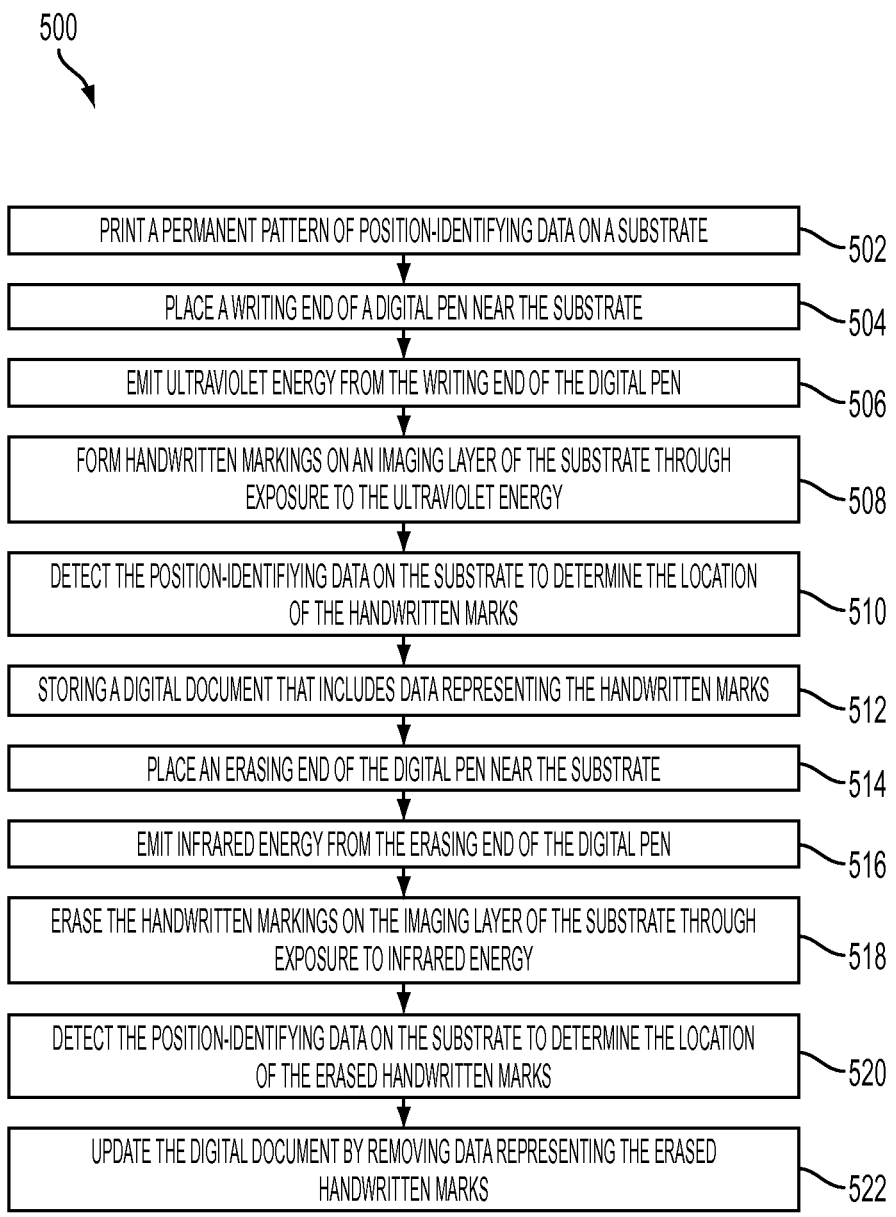
FIG. 5 is a flow chart illustrating a process in accordance with embodiments of the present disclosure.

FIG. 5 illustrates a detailed method of using the digital pen to create and edit a digital document and a physical document concurrently. A position-identifying pattern may be permanently printed or pre-printed on a substrate with a unique set of embedded position-identifying data that yields a unique pattern configured to be read by an optical collection device 502. The embedded data identifies physical positions of various locations on the substrate, or it may be used in connection with a data file that correlates the embedded data with assigned locations on the substrate. A writing end of a digital pen is placed near the substrate 504. In an embodiment, the writing end of the digital pen may include a force-sensitive writing tip that is connected to an activation switch. When the writing tip is pressed to a substrate, such as an erasable medium, the activation switch can be turned on to activate a first radiant energy source and emit energy from the writing end of the digital pen 506. As described above, the first radiant energy source may be an UV energy source emitting UV light at a wavelength between 10 and 500 nanometers. As the force sensitive writing tip is moved across the substrate, the photochromic and/or thermochromic compounds in the imaging layer of the substrate are chemically or physically altered to a colored state through exposure to the emitted energy from the writing end, forming handwritten markings on the substrate 508.

Concurrently with the forming of the handwritten markings on the substrate, an image-capturing sensor on the digital pen detects and captures data corresponding to the handwritten markings and the nearby portions of the position-identifying pattern data to determine the location of the handwritten markings on the substrate 510. The captured data will include at least some of the handwritten markings that a user of the pen makes on a substrate, along with at least some of the embedded position-identifying pattern data for the worksheet. The position-identifying pattern will be captured by the pen's optical sensor. The handwritten markings also may be captured by the pen's optical sensor, or by a position sensor (such as an accelerometer) that detects strokes of the pen.

The captured data may be saved and/or stored as a digital document that includes data representing the handwritten markings 512. Alternatively, the captured data may be transferred to a computing device that includes a processor configured to receive and store the data and/or the digital document. The processor may receive the data via a transmission from the pen's transmitter, or the device may be connected to the processor's computing device for transfer through a port such as a USB port.

The operator or user of the pen may wish to erase handwritten markings that have been formed on the substrate. Advantageously, the erasing end of the digital pen, distal to the writing end, includes a force sensitive erasing tip and a second radiant energy source. The erasing tip is pressed against the substrate to activate the second radiant energy source 514. When the second radiant energy source is activated and can emit energy from the erasing end of the digital pen 516. As discussed above, the second radiant energy source emits visible and/or infrared energy that may have a wavelength between 500 and 800 nanometers and between 730 nanometers and 1500 nanometers, respectively. As the force sensitive erasing tip is moved across the substrate, the photochromic and/or thermochromic compounds in the imaging layer of the substrate are chemically or physically altered from a colored state to a colorless state through exposure to the emitted energy from the erasing end, erasing handwritten markings on the substrate 518.

Concurrently with the erasing of the handwritten markings on the substrate, an image-capturing sensor on the erasing end of the digital pen detects and captures data corresponding to the handwritten markings and the nearby portions of the position-identifying pattern data to determine the location of the handwritten markings that have been erased from the substrate 520. The captured data will include at least the portion of the handwritten markings that a user of the pen erases from a substrate, along with at least some of the embedded position-identifying pattern data for the worksheet. The position-identifying pattern will be captured by the pen's optical sensor. The position of the erased handwritten markings also may be captured by the pen's optical sensor, or by a position sensor (such as an accelerometer) that detects strokes of the pen.

The captured data may be used to update the digital document that was previously stored 522. The processor on the pen uses the position-identifying pattern to determine the precise location of the markings that are being erased. The newly captured position-identifying data is then compared with the position-identifying pattern data in the previously saved digital document. If any position-identifying pattern data associated with the previously saved handwritten markings are within a specified positional tolerance of the newly captured (erased) position-identifying pattern data, those handwritten markings are erased. Alternatively, the captured data may be first transferred to a computing device that includes a processor configured to update the data and/or the digital document. The processor may receive the updated data via a transmission from the pen's transmitter, or the device may be connected to the processor's computing device for transfer through a port such as a USB port.

Figure 6:
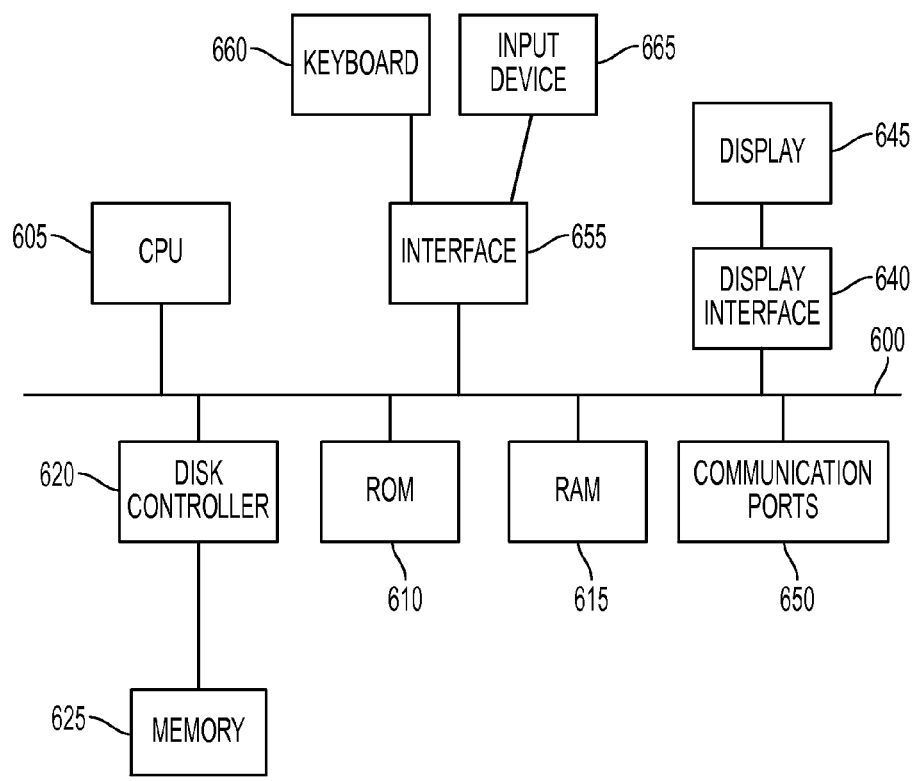
FIG. 6 is a block diagram of a computing device in accordance with embodiments of the present disclosure.

FIG. 6 depicts a block diagram of internal hardware that may be used to contain or implement the process discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 6, is a processing device, computing device or processor as such terms are used within this disclosure. Read only memory (ROM) 610 and random access memory (RAM) 615 constitute exemplary memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. A communication port 650 may be attached to a communications network, such as the Internet or an local area network.

The hardware may also include an interface 655 which allows for receipt of data from input devices such as a keyboard 660 or other input device 665 such as a mouse, a joystick, a touch screen, a remote control, a pointing device, a video input device and/or an audio input device.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. An information capture system comprising:
a substrate having a permanent position-identifying microdot pattern printed thereon and that comprises an imaging layer that is imageable when exposed to an energy emission of a first wavelength and erasable when exposed to an energy emission of a second wavelength;
a digital pen comprising a first end, a second end, an image-capturing sensor, a position sensor that comprises an accelerometer or a gyroscope, a memory, a force-sensitive writing tip and a first energy source that is capable of emitting energy of the first wavelength, the digital pen including program instructions that are capable of instructing the digital pen to:
    emit energy from the first energy source when the force-sensitive writing tip is activated, so that the energy from the first energy source will cause the substrate to form an image comprising a first set of handwritten markings thereon,
    concurrently with the forming of the first set of handwritten markings on the substrate, detect by the image-capturing sensor a first detected portion of the position-identifying microdot pattern, in which the first detected portion corresponds to a location of the first set of handwritten markings on the substrate,
    concurrently with the forming of the first set of handwritten markings on the substrate, detect by the position sensor a first detected set of position data corresponding to movement of the digital pen, wherein the first detected set of position data comprises position data collected using the accelerometer or the gyroscope, and
    store in the memory an editable digital document file comprising the first set of handwritten markings using the first detected portion of the position-identifying microdot pattern and the first detected set of position data.

2. The information capture system of claim 1, further comprising:
computer-readable instructions that are capable of instructing a processor to:
    establish a data connection with the digital pen;
    receive the editable digital document file comprising the first set of handwritten markings from the digital pen; and
    store, in the memory, the editable digital document file comprising the first set of handwritten markings.

3. The information capture system of claim 1, in which the digital pen further comprises:
a force-sensitive erasing tip;
a second image-capturing sensor and a second energy source capable of emitting energy of the second wavelength; and
program instructions that are capable of instructing the pen to emit energy from the second energy source when the force-sensitive erasing tip is activated, so that the energy from the second energy source causes at least a portion of the first set of handwritten markings to be erased from the substrate.

4. The information capture system of claim 3, wherein the force-sensitive writing tip, the first energy source and the second energy source are proximate to the first end.

5. The information capture system of claim 3, wherein the force-sensitive writing tip and the first energy source are proximate to the first end, and the force-sensitive erasing tip and the second energy source are proximate to the second end.

6. The information capture system of claim 3 wherein the first energy source is an ultraviolet energy source and the second energy source is at least one of an infrared energy source and a visible light energy source.

7. The information capture system of claim 3, in which the digital pen further includes program instructions that are capable of instructing the pen to:
    concurrently with the erasing of handwritten markings from the substrate, detect by the second image-capturing sensor a second detected portion of the position-identifying microdot pattern, in which the second detected portion of the position-identifying microdot pattern corresponds to the location of a portion of the first set of handwritten markings that have been erased;
    concurrently with the erasing of handwritten markings from the substrate, detect by the position sensor a second detected set of position data corresponding to movement of the digital pen; and
    update the editable digital document file stored in the memory by removing data corresponding to the portion of the first set of handwritten markings that have been erased using the second detected portion of the position-identifying microdot pattern and the second detected set of position data.

8. The information capture system of claim 7, in which the digital pen further includes program instructions that are capable of instructing the pen to:
    emit energy from the first energy source when the force-sensitive writing tip is activated, so that the energy from the first energy source will cause the substrate to form an image comprising a second set handwritten markings thereon;
    concurrently with the forming of the second set of handwritten markings on the substrate, detect by the image capturing sensor a third detected portion of the position-identifying microdot pattern, in which the third detected portion of the position-identifying microdot pattern corresponds to the location of the second set of handwritten markings on the substrate;
    concurrently with the forming of the second set of handwritten markings on the substrate, detect by the position sensor a third detected set of position data corresponding to movement of the digital pen; and
    update the editable digital document file stored in the memory by storing data corresponding to the second set of handwritten markings using the third detected portion of the position-identifying microdot pattern and the third detected set of position data.

9. The information capture system of claim 8, further comprising:
an erasing device that comprises a third energy source configured to emit energy of a third wavelength, wherein all handwritten markings on the substrate are erased when inserted into the erasing device and exposed to the third energy source.

10. The information capture system of claim 9, wherein the third energy source is at least one of an infrared energy source and a visible light energy source.

11. A method of capturing information comprising:
    emitting energy of a first wavelength from a first energy source located proximate to a first end of a digital pen that includes a force-sensitive writing tip, in which the energy is emitted when the force-sensitive writing tip is activated proximate to a substrate having a permanent position-identifying microdot pattern printed thereon;

forming an image comprising a first set handwritten markings on the substrate as a result of an exposure of the substrate to the energy emitted from the first energy source;

concurrently with the forming of the first set of handwritten markings on the substrate, detecting by an image-capturing sensor of the digital pen a first detected portion of the position-identifying microdot pattern, in which the first detected portion corresponds to a location of the first set of handwritten markings on the substrate;

concurrently with the forming of the first set of handwritten markings on the substrate, detecting by a position sensor of the digital pen a first detected set of position data corresponding to movement of the digital pen, wherein the position sensor comprises one or more of the following: an accelerometer or a gyroscope, and wherein the first detected set of position data comprises position data collected using the accelerometer or the gyroscope; and storing in the memory of the digital pen an editable digital document file comprising the first set of handwritten markings using the first detected portion of the position-identifying microdot pattern and the first detected set of position data.

12. The method of claim 11, further comprising:

emitting energy of a second wavelength from a second energy source located proximate to a second end of the digital pen that includes a force-sensitive erasing tip, in which the energy is emitted when the force-sensitive erasing tip is activated proximate to the substrate; and erasing at least a portion of the first set of handwritten markings by exposing a portion of the substrate to energy from the second energy source.

13. The method of claim 12, further comprising:

concurrently with the erasing of at least a portion of the first set of handwritten markings on the substrate, detecting by a second image-capturing sensor a second detected portion of the position-identifying microdot pattern, in which the second detected portion corresponds to the location of the portion of the first set of handwritten markings that have been erased;

concurrently with the erasing of at least a portion of the first set of handwritten markings on the substrate, detecting by the position sensor a second detected set of position data corresponding to movement of the digital pen; and updating the editable digital document stored in the memory by removing data corresponding to the portion of the first set of handwritten markings that have been erased using the second detected portion of the position-identifying microdot pattern and the second detected set of position data.

14. The method of claim 13, further comprising:

emitting energy of the first wavelength from the first energy source when the force-sensitive writing tip is activated, so that the energy from the first energy source will cause the substrate to form an image comprising a second set handwritten markings thereon;

concurrently with the forming of the second set of handwritten markings on the substrate, detecting by the image capturing sensor a third detected portion of the position-identifying microdot pattern, in which the third detected portion corresponds to the location of the second set of handwritten markings on the substrate;

concurrently with the forming of the second set of handwritten markings on the substrate, detecting by the position sensor a third detected set of position data corresponding to movement of the digital pen; and updating the editable digital document file stored in the memory by storing data corresponding to the second set of handwritten markings using the third detected portion of the position-identifying microdot pattern and the third detected set of position data.

15. A digital pen comprising:

a housing;

a processor;

a first image-capturing sensor configured to decode a permanent position-identifying microdot pattern printed on a substrate;

a position sensor configured to detect position data based on the movement of the digital pen, wherein the position sensor comprises one or more of the following: an accelerometer or a gyroscope;

a document memory for storing digital documents;

a force-sensitive writing tip proximate to a first end of the housing;

a first energy source that is capable of emitting energy of the first wavelength and is proximate to the first end of the housing; and a computer readable storage medium configured to store program instructions capable of instructing the processor to:

cause the first energy source to emit energy when the force-sensitive writing tip is activated, so that the energy from the first energy source will cause the substrate to form an image comprising a first set handwritten markings thereon;

concurrently with the forming of the first set of handwritten markings on the substrate, receive from the image-capturing sensor detecting a first detected portion of the position-identifying microdot pattern on the substrate and the first set of handwritten markings;

concurrently with the forming of the first set of handwritten markings on the substrate, determine a first location of the first set of handwritten markings on the substrate based on the first detected portion of the position-identifying microdot pattern;

concurrently with the forming of the first set of handwritten markings on the substrate, determine a first movement of the digital pen, using the position sensor, by detecting a first detected set of position data corresponding to movement of the digital pen, wherein the first detected set of position data comprises position data collected using the accelerometer or the gyroscope; and generate an editable digital document file comprising the first set of handwritten markings using the first detected portion of the position-identifying microdot pattern and the first detected set of position data.

16. The digital pen of claim 15, in which the program instructions are capable of instructing the processor to store the editable digital document file in the document memory.

17. The digital pen of claim 16, wherein:

the digital pen further comprises a second image-capturing sensor, a force-sensitive erasing tip, and a second energy source capable of emitting energy of a second wavelength, said second image-capturing sensor, said force-sensitive erasing tip, and said second energy source are proximate to a second end of the housing; and the program instructions are capable of instructing the processor to cause the second energy source to emit energy when the force-sensitive erasing tip is activated proximate to the substrate, in which the energy from the second energy source causes at least a portion of the first set of handwritten markings to be erased from the substrate.

18. The digital pen of claim 17, in which the program instructions are capable of instructing the processor to:
concurrently with the erasing of at least a portion of the first set of handwritten markings on the substrate, determine a second location of the digital pen, using the second image-capturing sensor, by detecting a second detected portion of the position-identifying microdot pattern, in which the second detected portion of the position-identifying microdot pattern corresponds to the location of a portion of the first set of handwritten markings that have been erased;
determine the location of the first set of handwritten markings on the substrate based on the second detected portion of the position-identifying microdot pattern;
determine a second movement of the digital pen, using the position sensor, by detecting a second detected set of position data corresponding to movement of the digital pen; and
update the editable digital document file stored in the memory by removing data corresponding to the portion of the first set of handwritten markings that have been erased using the second detected portion of the position-identifying microdot pattern and the second detected set of position data.

19. The digital pen of claim 18, in which the program instructions are capable of instructing the processor to:
cause the first energy source to emit energy of the first wavelength when the force-sensitive writing tip is activated proximate to the substrate, the energy from the first energy source causing the substrate to form an image comprising a second set handwritten markings thereon;
concurrently with the forming of the second set of handwritten markings on the substrate, determine a location of the digital pen, using the first image-capturing sensor, by detecting a third detected portion of the position-identifying microdot pattern and the second set of handwritten markings;
determine the location of the second set of handwritten markings on the substrate based on the third detected portion of the position-identifying microdot pattern;
determine the movement of the digital pen, using the position sensor, by detecting a third detected set of position data corresponding to movement of the digital pen; and
update the editable digital document file stored in the memory by storing data corresponding to the second set of handwritten markings using the third detected portion of the position-identifying microdot pattern and the third detected set of position data.

20. The digital pen of claim 19, in which the digital pen further comprises a communications port capable of communication with a computing device, and the program instructions are capable of instructing the processor to:
initiate a connection with the computing device through the communications port; and
transmit the editable digital document to the computing device.

21. The digital pen of claim 17, in which the first energy source is an ultraviolet energy source and the second energy source is at least one of an infrared energy source and a visible light energy source.

* * * * *